United States Patent
Kim et al.

(10) Patent No.: US 8,227,111 B2
(45) Date of Patent: Jul. 24, 2012

(54) SECONDARY BATTERY HAVING ELECTROLYTE SEALING PLUG

(75) Inventors: Jinwook Kim, Yongin-si (KR); Hideaki Yoshio, Yongin-si (KR); Jinwan Jeong, Yongin-si (KR); Jaeil Seong, Yongin-si (KR); Soonki Woo, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 728 days.

(21) Appl. No.: 11/984,656

(22) Filed: Nov. 20, 2007

(65) Prior Publication Data

US 2008/0160393 A1    Jul. 3, 2008

(30) Foreign Application Priority Data

Dec. 28, 2006 (KR) .............................. 2006-0136882
Feb. 1, 2007 (KR) .............................. 2007-0010420

(51) Int. Cl.
  *H01M 2/08* (2006.01)
(52) U.S. Cl. ...................................................... 429/185
(58) Field of Classification Search ........... 429/122–347
  See application file for complete search history.

(56) References Cited

U.S. PATENT DOCUMENTS 7,687,199 B2 * 3/2010 Kim et al. ..................... 429/185
2006/0257733 A1 * 11/2006 Kim et al. ..................... 429/185

FOREIGN PATENT DOCUMENTS

JP      2004-119329        4/2004
JP      2005190776 A  *  7/2005

OTHER PUBLICATIONS

Machine Translation of JP 2004-119329 to Hagino et al. originally published on Apr. 2004.*
Machine Translation of JP 2005-190776 to Mizuno et al. originally published on Jul. 2005.*
Math Forum—Drexel University, Dr. Math Presents More Geometry, 2005, John Wiley & Sons, Inc., pp. 98-101.*

* cited by examiner

*Primary Examiner* — Basia Ridley
*Assistant Examiner* — Jonathan G Leong
(74) *Attorney, Agent, or Firm* — Robert E. Bushnell, Esq.

(57) ABSTRACT

A secondary battery includes an electrode assembly including: a winding having a positive electrode plate, a negative electrodes plate, and stacked together with a separator interposed between the positive and negative electrode plate; a can having an opening portion to receive the electrode assembly; a cap assembly including a cap plate to close the opening portion of the can, the cap plate having an electrolyte injection hole arranged therein; and a first extension groove having a greater diameter than that of the electrolyte injection hole, the first extension groove being arranged in an entering portion of the electrolyte injection hole and having at least one hollow portion arranged on the surface of the first extension groove.

10 Claims, 10 Drawing Sheets

SECONDARY BATTERY HAVING ELECTROLYTE SEALING PLUG

CLAIM OF PRIORITY

This application makes reference to, incorporates the same herein, and claims all benefits accruing under 35 U.S.C. §119 from the applications for SECONDARY BATTERY AND THE MANUFACTURING THEREOF earlier filed in the Korean Intellectual Property Office on the Dec. 28, 2006 with assigned Serial No. 10-2006-0136882 and on the Feb. 1, 2007 with assigned Ser. No. 10-2007-0010420.

BACKGROUND OF THE INVENTION

1. Field of the Invention

The present invention relates to a secondary battery and its method of manufacture, and more particularly, the present invention relates to the structure of an electrolyte injection-hole for injecting an electrolyte and an assembly that seals the electrolyte injection-hole and its method of manufacture.

2. Description of the Related Art

Recently, compact and light electronic devices such as cellular phones, notebook computers, camcorders and the like have been actively developed and produced. These portable electronic devices contain a battery pack to be operable without being plugged into an electrical outlet. The battery pack is provided with at least one battery therein so as to output a certain level of voltage to drive the portable electronic device. Battery packs have been developed to use rechargeable secondary batteries in consideration of economic views in recent years. Furthermore, a secondary battery has become a favorite choice for hybrid car batteries which require high density energy and high power.

Representative secondary batteries include nickel-cadmium Ni—Cd batteries, nickel-hydrogen Ni-MH batteries, lithium Li batteries, and lithium ion batteries, etc.

Especially, lithium secondary batteries have been widely utilized because their energy density per unit weight is high, and their operation voltage is three times higher than nickel-cadmium batteries or nickel-hydrogen batteries used as the power supply of a portable electronic device. In such a lithium secondary battery, active material of the positive electrode is made primarily from a lithium-based oxide, while active material of the negative electrode is formed of a carbon material. Generally, lithium secondary batteries can be classified into liquid electrolyte batteries and polymer electrolyte batteries based on the kind of electrolyte used. Accordingly, batteries using a liquid electrolyte are referred to as lithium ion batteries, while batteries using a polymer electrolyte are referred to as lithium polymer batteries. Furthermore, lithium secondary batteries are manufactured into various types, for example cylindrical types, prismatic types and pouch types.

Explaining the manufacturing process of general secondary batteries, first of all, an electrode assembly is manufactured by sequentially stacking and winding a positive electrode plate coated with the positive active material and including a positive electrode tap connected a collector of positive electrode, a negative electrode plate coated with the negative active material and including a negative electrode tap connected a collector of negative electrode, and a separator interposed between the positive electrode plate and the negative electrode. And, a pillar shape in an oval of electrode assembly is made by compression. After adhering the finishing tape to the outer surface of the electrode assembly, then inserting in the can to settle the insulating case in the upper portion of the electrode assembly. At the same time, uniting the cap plate, the insulating plate, and the terminal plate, the cap assembly is formed to unite the electrode terminal including the insulating gasket in the central hole configured with the cap plate, the insulating plate and the terminal plate. Thereafter, the electrolyte is injected to the electrolyte injection hole formed in the cap plate after sealing the can with the cap plate of the cap assembly. Then the secondary battery is completed by sealing the electrolyte injection hole. The method of sealing the electrolyte injection hole includes inserting by force a ball in the direction of the electrolyte injection hole after inserting the ball, having a greater diameter than that of the electrolyte injection hole into the electrolyte injection hole, an then welding the ball inserted with pressure and the area around the ball to seal up the electrolyte injection hole.

However, the problem of leaking electrolyte or electrolyte gas occurs because the electrolyte injection hole is not sealed closely in the period of inserting the ball with pressure. At this point, if the ball inserted into the electrolyte injection hole is welded, the excessive current flows in the leaking electrolyte, which enables the ball inserted with pressure and the area around the ball to melt for forming the crack. Further, for solving these problems there incorporated the coating process of resins to the ball inserted with pressure since welding, wherein the coated resins apt to drop by the exterior shock and the manufacturing cost increased due to the coating process of resins added.

SUMMARY OF THE INVENTION

Accordingly, it is an object of the present invention is to prevent the leakage of electrolyte.

Also, another object of the present invention is to seal the electrolyte injection hole without increasing manufacturing costs.

To achieve this object, the present invention provides a secondary battery including: an electrode assembly including a winding having a positive electrode plate, a negative electrodes plate, and stacked together with a separator interposed between the positive and negative electrode plate; a can having an opening portion to receive the electrode assembly; a cap assembly including a cap plate to close the opening portion of the can, the cap plate having an electrolyte injection hole arranged therein; and a first extension groove having a greater diameter than that of the electrolyte injection hole, the first extension groove being arranged in an entering portion of the electrolyte injection hole and having at least one hollow portion arranged on the surface of the first extension groove.

Also, a sealing assembly including a sealing member is formed on the surface of the first extension groove, and a plug attached to the sealing member to seal the electrolyte injection hole.

Also, the plug is provided with a head portion attached to the sealing member and a body portion coupled to the electrolyte injection hole having no first extension groove.

Also, the sealing member is coated in the first extension groove.

Also, the sealing member formed on the hollow portion is thicker than the sealing member formed on a surface where the hollow portion is not formed.

Also, a section of the hollow portion is formed in a trapezoid or half-circle shape.

Also, a second extension groove having an even depth and having a diameter greater than that of the first extension groove is formed at an entering portion of the electrolyte injection hole in which the first extension groove is formed.

Also, a boundary edge between the first extension groove and the electrolyte injection hole is chamfered.

Also, the sealing member is formed of rubber material.

Also, the sealing member is formed of any rubber selected from fluorine-rubber, butadiene rubber, and isobutylene-isoprene rubber.

Also, the sealing member is formed of fluorine-resins or polyolefin-resins.

Also, the plug is formed of aluminum or an alloy of aluminum.

Also, the electrolyte injection hole is formed in the can, and the sealing assembly seals the electrolyte injection hole.

A method of manufacturing a second battery includes: spreading a sealing member in a electrolyte injection hole formed in a cap plate; assembling a cap assembly including the cap plate; sealing and joining an opening portion of a can containing an electrode assembly with the cap plate of the cap assembly; injecting electrolyte into the can through the electrolyte injection hole; and sealing the electrolyte injection hole in which the sealing member is coated with a plug.

Also, spreading the sealing member in the electrolyte injection hole formed in the cap plate includes: preparing the spray needle containing sealing solvent; positioning the end of the spray needle to a first extension groove of the electrolyte injection hole; and spreading the sealing solvent to the electrolyte injection hole with the spray needle being moved.

Also, sealing the electrolyte injection hole in which by the sealing member is coated with the plug includes: inserting a ball into a electrolyte injection hole where the sealing member is coated; and pressing the ball in the electrolyte injection hole to adhere to the sealing member.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein:

FIG. 2b is a sectional view of a plug coupled to the electrolyte injection hole of FIG. 2a.

FIG. 3a and FIG. 3b are sectional views of an enlarged portion of "a" in FIG. 2a.

DETAILED DESCRIPTION OF THE INVENTION

Figure 1:
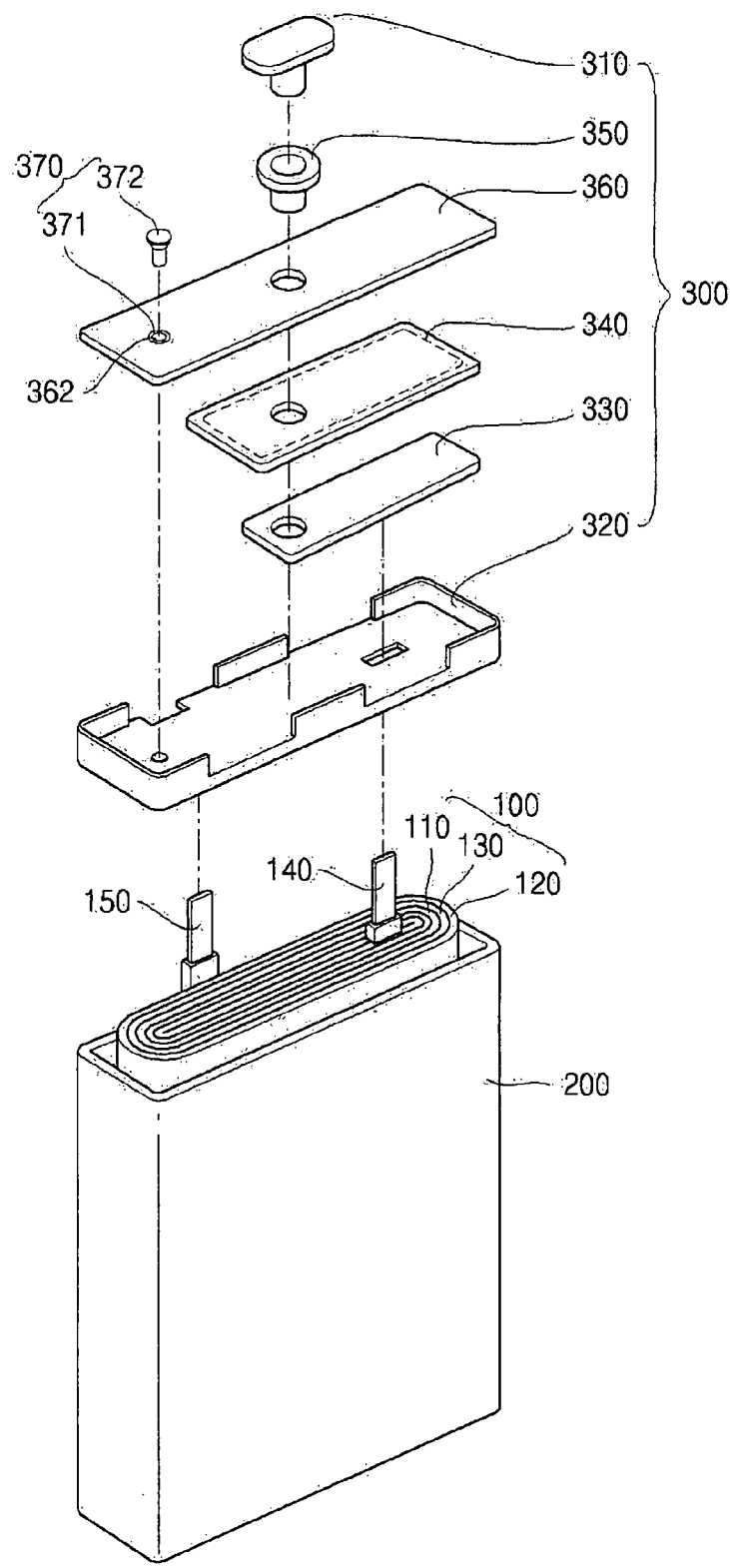
FIG. 1 is an exploded perspective view of a secondary battery according to an embodiment of the present invention.

Referring to FIG. 1, a secondary battery in accordance with the present invention includes an electrode assembly 100, a can 200 and a cap assembly 300.

The electrode assembly 100 includes a positive electrode plate 110 having a positive electrode tap 150, a negative electrode plate 120 having a negative electrode tap 140, and a separator 130, these elements being sequentially stacked and wound.

The positive electrode plate 110 has a collector of the positive electrode and an active material layer of the positive electrode. The active material layer of the positive electrode consists of a lamellar compound including lithium, a binder to improve the bonding strength and a conductive material to improve the conductability. The collector of the positive electrode is generally formed of aluminum and is the pathway of moving charges generated in the active material layer of the positive electrode and plays a role of sustaining the active material layer of the positive electrode. The active material layer of the positive electrode is attached to the wide surfaces of the collector of the positive electrode, a non-coated portion of the positive electrode (not shown) in which the active material layer of the positive electrode is not formed is constituted at one side end of the positive electrode plate, and the positive electrode tap 150 is coupled to the non-coated portion of the positive electrode.

The negative electrode plate 120 has a collector of the negative electrode and the active material layer of the negative electrode. The active material layer of the negative electrode generally contains hard carbon, or a binder that improves bonding power between graphite and particles of the active material. Copper is used for the collector of the negative electrode which is the moving pathway of charges generated in the active material layer of the negative electrode and sustains the active material layer of the negative electrode.

The active material layer of the negative electrode is coated on the wide surface of the negative electrode plate 120, while the non-coated portion of the negative electrode (not shown) in which the active material layer of the negative electrode is not coated on one end of the negative electrode plate 120. The negative electrode tap 140 is connected to the non-coated portion of the negative electrode.

A separator is interposed between the positive electrode plate 110 and the negative electrode plate 120 to insulate them. In general, although polyethylene PE or polypropylene PP is used for the separator 130, the present invention is not limited thereto. The separator 130 includes an electrolyte of either a liquid phase type or a gel type.

The negative tap 140 electrically connects the electrode assembly 100 to the electrode terminal 310, and is coupled to the non-coated portion of the negative electrode plate 120. Generally, aluminum or an aluminum alloy, or, nickel or a nickel alloy is used for the negative electrode tap 140. However, the present invention is not limited thereto.

The positive tap 150 electrically connects the electrode assembly 100 to the cap plate 350, and is coupled to the non-coated portion of the positive electrode plate. Generally, aluminum or an aluminum alloy, or, nickel or a nickel alloy is used for the positive electrode tap 150. However, the present invention is not limited thereto.

The can 200 accommodating the electrode assembly 100 has an opening portion on its end. The can 200 has either a prismatic or track shape in consideration of the shape of the electrode assembly 100, and after the electrode assembly 100 is arranged in the can 200, the electrolyte is arranged in the can 200. The can 200 for containing the electrode assembly 100 is sealed by welding or heat adhering to the cap plate 360 of the cap assembly 300 after arranging the insulating case in the upper portion of the electrode assembly 100. The case 200 is formed of aluminum. However, the present invention is not limited thereto.

The cap assembly 300 includes an electro terminal 310 electrically connected to the negative electrode tap 140 of the electrode assembly 100, an insulating case 320 arranged inside of the opening portion of the case 200 containing the electrode assembly 100, and a terminal plate 330 is coupled to one end of the electrode terminal 310 to form a central hole between the insulating plate, the insulating plate 340 including the central hole for coupling the terminal plate 330 to a pillar portion of the electrode terminal 310 and for insulating the terminal plate 330 from the cap plate 360, and an insulating gasket tube 350 for enclosing the pillar portion of the electrode terminal 310 and arranged in the central hole of the cap plate 360. The cap plate 360 has an electrolyte injection hole 370 for injecting electrolyte. The cap plate 360 has safety vents (not shown) which open when the internal pressure of the secondary battery exceeds a critical pressure to prevent an explosion of the secondary battery.

An electrolyte injection hole sealing assembly 370 includes a sealing member 371 and a plug 372.

Hereafter, various embodiments of the electrolyte injection hole 362 and sealing assembly 370 are described in more detail with reference to the drawings.

Figure 2A:
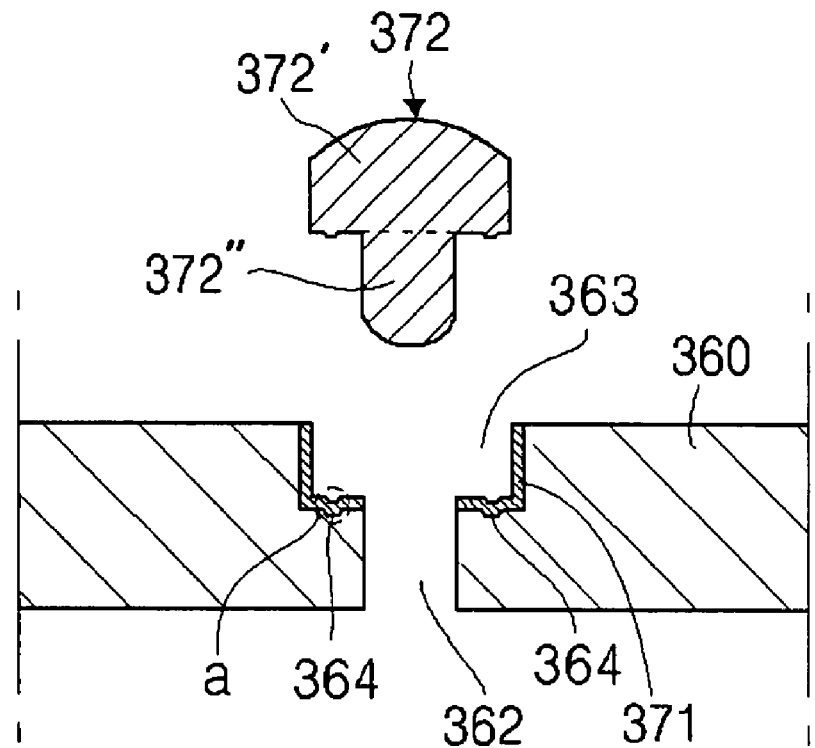
FIG. 2a is a sectional view of an electrolyte injection hole for sealing the electrolyte injection hole and an extension groove formed according to an embodiment of the present invention.
Figure 2B:
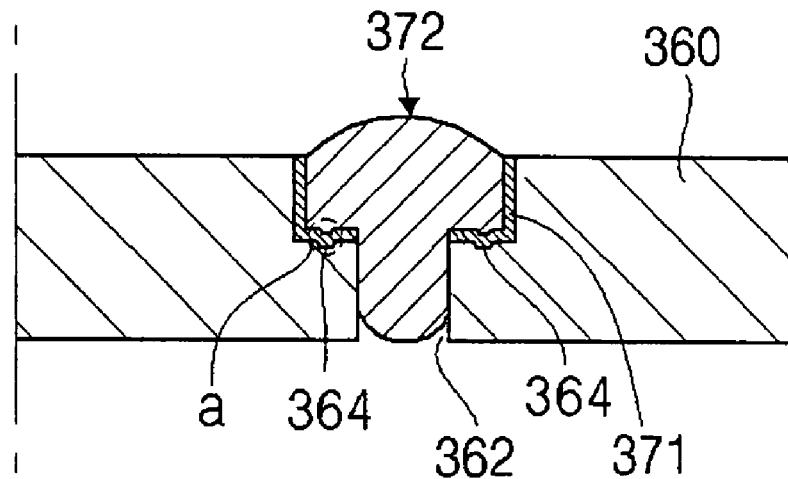

Referring to FIG. 2a, a first extension groove 363 having a diameter bigger than the diameter of the electrolyte injection hole 362 is formed in an entering portion of the electrolyte injection hole 362. The first extension groove 363 provides a space in which the sealing member 371 can be formed, and forms coupling portion in which the plug 372 is arranged in the electrolyte injection hole 362 as well. FIG. 2b shows the plug 372 arranged in the electrolyte injection hole 362.

Also, at least one of hollow portions 364 is formed on the surface of the first extension groove 363. The hollow portion 364, formed as a groove or a protrusion, in the case of sealing the electrolyte injection hole 362 is formed in the hollow portion 364 in the first extension groove 363 with the plug 372, which leads to the effect of fixing in the sealing member 371.

At this point, electrolyte contained in the can does not leak upon sealing the electrolyte injection hole 362 with the plug 372 by attached it to the sealing member 371 is formed on the surface of the first extension groove 363. The plug 372 and the sealing member 371 are embodied into various shapes due to the shape of the electrolyte injection hole 362 and the first extension groove 363.

Moreover, the plug 372 is provided with the head portion 372' attached to the sealing member 371 and the body portion 372" coupled to the electrolyte injection hole 362 where the first extension groove 363 is not formed. Since the electrolyte injection hole 362 is sealed using the plug 372, the leakage of electrolyte is prevented.

Also, the sealing member 371 can be coated in the first extension groove 363. Upon forming of the sealing member 371 in the first extension groove 363, the sealing member 371 is fixed in the first extension groove 363, which increases the effect of sealing when sealing the electrolyte injection hole 362 with the plug 372.

At this time, in the hollow portion 364, the sealing member formed on the hollow portion 364 is thicker than the sealing member formed on a surface where the hollow portion is not formed. Upon thickly spreading the sealing member 371 in the hollow portion 364, the sealing member 371 is prevented from being torn by the hollow portion 364 when the electrolyte injection hole 372 is attached to the sealing member 371.

Figure 3A:
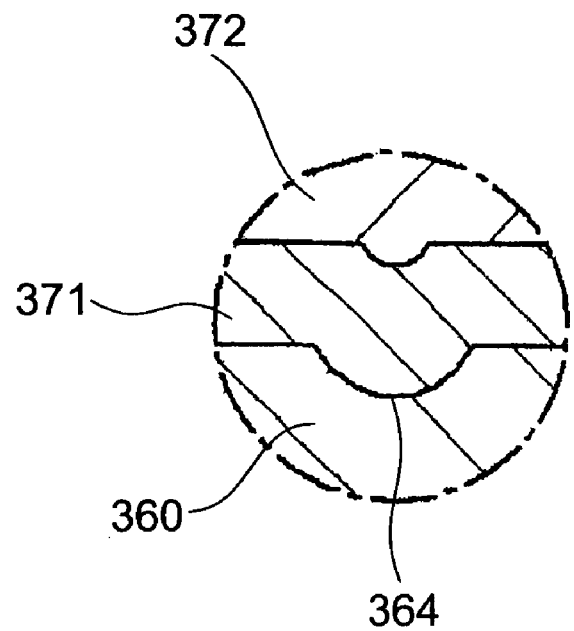
Figure 3B:
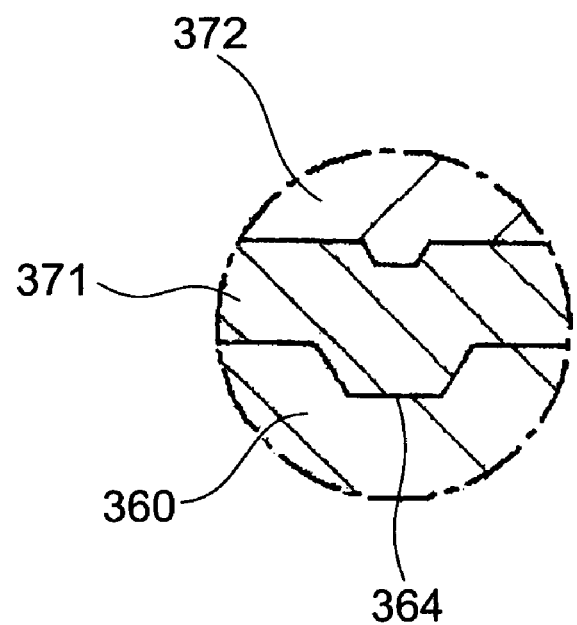

Referring to FIGS. 3a and 3b, a section of hollow portion 364 is formed in a trapezoid or half-circle shape. When the sealing member 371 is spread on the hollow portion 364 including a section of the trapezoid or half-circle shape, the curvature of the sealing member 371 is reduced to prevent the sealing member 371 from being torn by the hollow portion 364.

Figure 4:
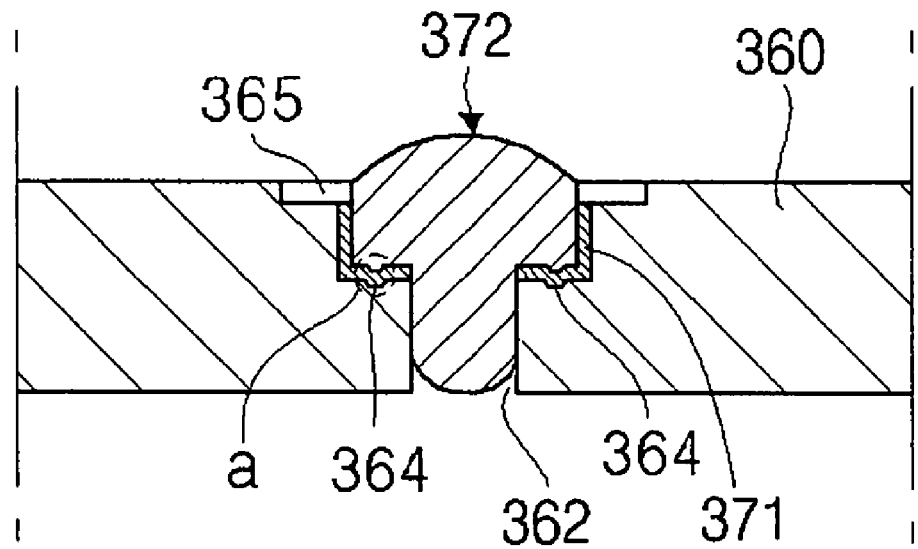
FIG. 4 is a sectional view of a second extension groove formed in an entering portion of an electrolyte injection hole according to an embodiment of the present invention.

Referring to FIG. 4, a second extension groove 365 of even depth and having a greater diameter than that of the first extension groove 363 can be formed at the entering portion of the electrolyte injection hole 362 in which the first extension groove 363 is formed. As the sealing member 371 would not cross over the upper surface of the cap plate 360 in that second extension groove 365, striping of the sealing member 371 is prevented when cleaning the upper surface of the cap plate with a brush or cleaning tool.

Figure 5:
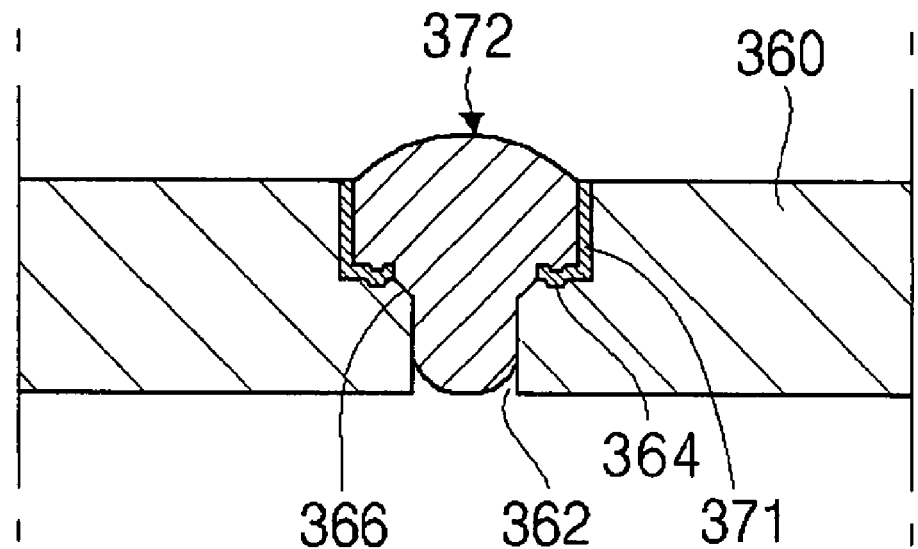
FIG. 5 is a section view of the edge formed inside of the electrolyte injection hole according to an embodiment of the present invention has corner-removed.

Referring to FIG. 5, the boundary edge between the first extension groove 363 and the electrolyte injection hole 362 is chamfered. When the boundary edge 366 is chamfered, the plug 372 is more easily inserted into the electrolyte injection hole 362.

Turning to FIG. 2a, the sealing member 371 is formed of rubber material. Upon realizing the sealing member 371 with rubber, the sealing member 371 is shrunk when the plug 372 is inserted into the electrolyte injection hole 362, and the shrunk sealing member 371 makes the plug 372 and the electrolyte injection-hole 362 tighter due to the elastic power of rubber.

In addition, the sealing member 371 can be is formed of fluorine-rubber, butadiene rubber, or isobutylene-isoprene rubber.

Also, the sealing member 371 is formed of fluorine-resins or polyolefin-resins. With a lower viscosity than the material including the nature of rubber, it has the strong point of good effect in spreading when fluorine-resins or polyolefin-resins are melted and spread in the electrolyte injection hole 371. Thus, when coating the sealing member 371 with fluorine-resins or polyolefin-resins, it represents good results in view of completion of formation.

Furthermore, the plug 372 is formed of aluminum or an alloy of aluminum. When the plug 372 is formed of aluminum or an alloy of aluminum, on pressing and inserting the head portion 372' mechanically after inserting the plug 372 into the sealing member 371 with good elasticity of aluminum, the sealing member 371 is tighter where the head portion 372' is inserted with pressure in the first extension groove 363 of the electrolyte injection hole 362. Thus, the degree of sealing becomes better.

Figure 6:
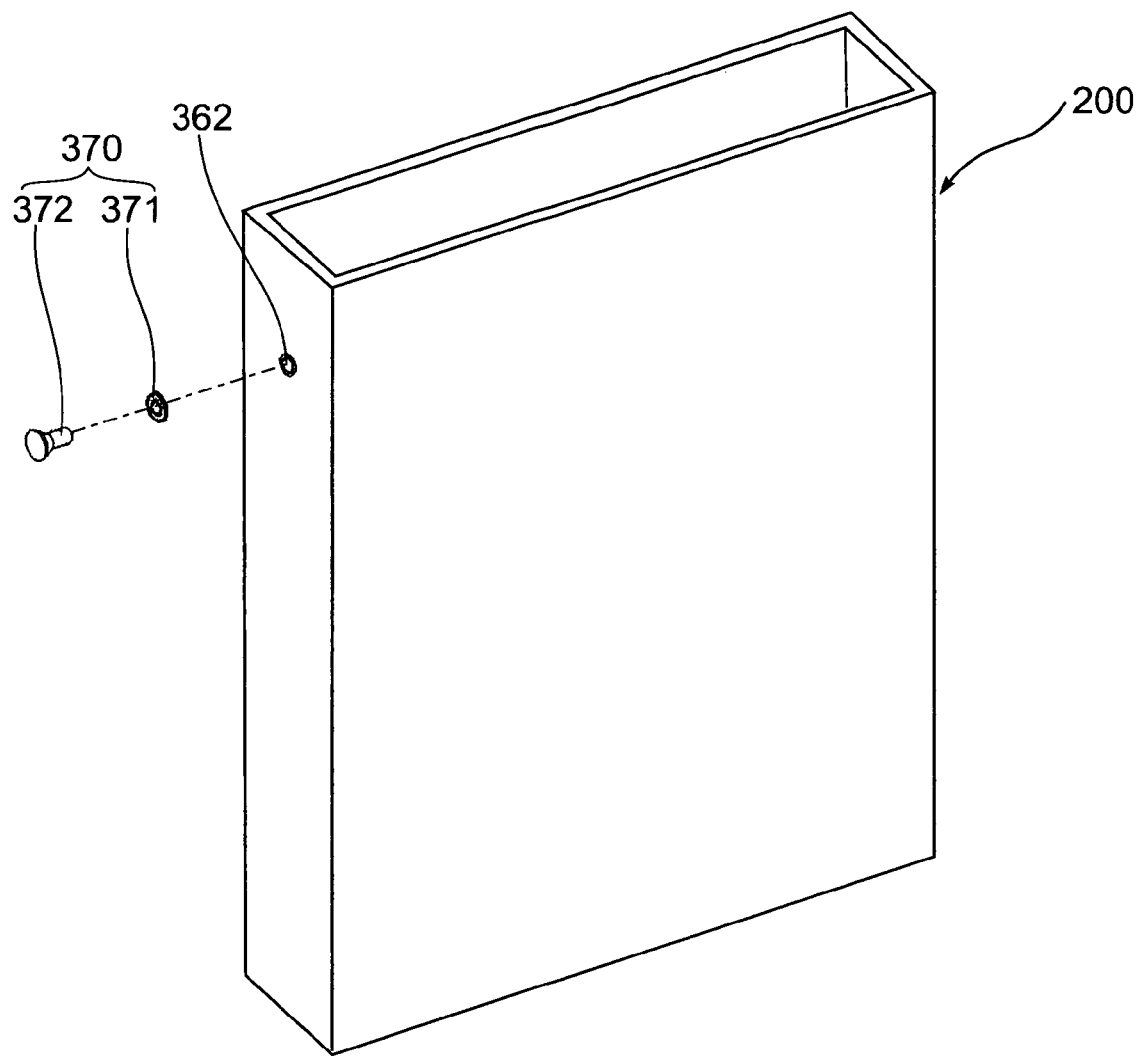
FIG. 6 is a perspective view of a disassembled sealing assembly for sealing the electrolyte injection hole after formation of the electrolyte injection hole in the one side of the can according to an embodiment of the present invention.

Referring to FIG. 6, the electrolyte injection hole 362 is formed in the can 200, and the sealing assembly 370 may seal up the electrolyte injection hole 362. Likewise, upon the formation of the electrolyte injection hole 362 in the can 200, the manufacturing time of the cap plate 360 and the can 200 controlled reasonably due to the case in manufacturing the secondary battery, which may reduce the manufacturing time of the secondary battery.

Figure 7:
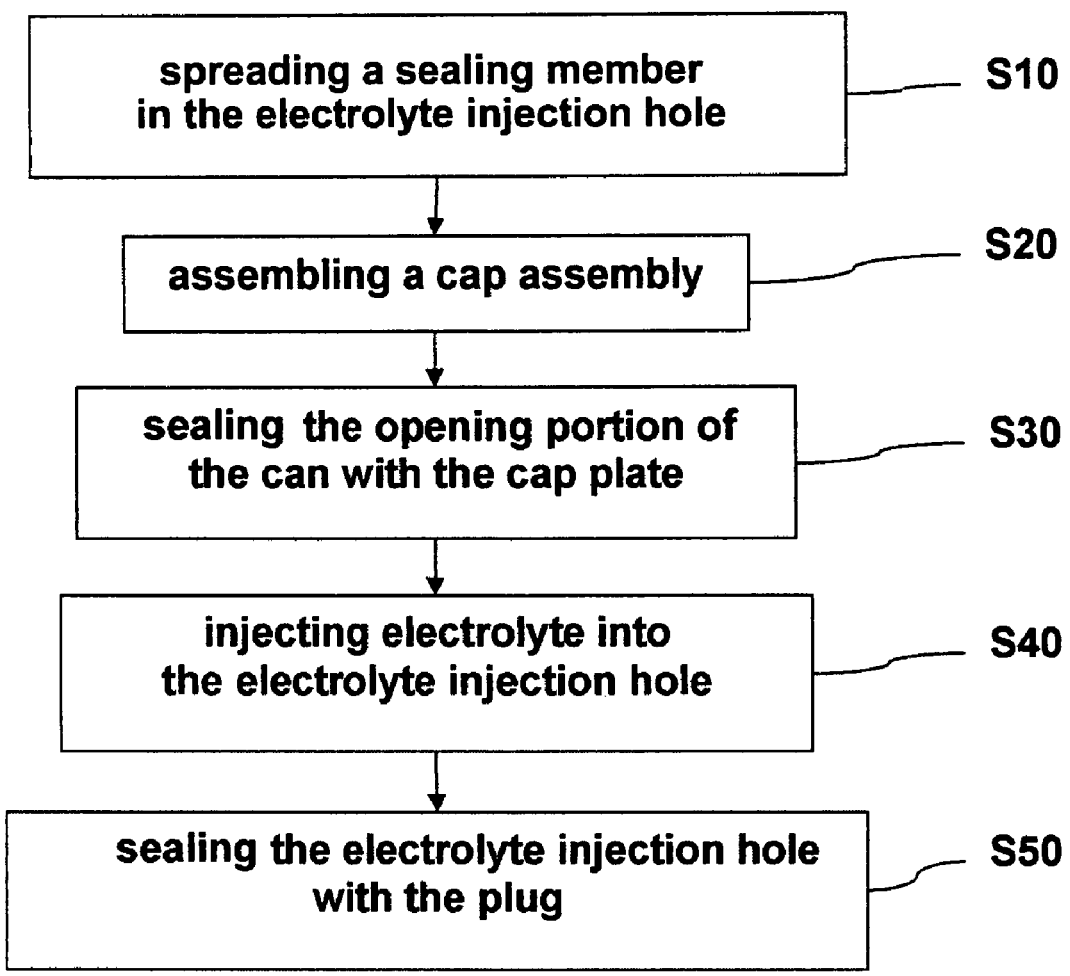
FIG. 7 is a flowchart of the sequence of a method of sealing an electrolyte injection hole of a secondary battery according to an embodiment of the present invention.

A method of manufacturing the second battery in accordance with an embodiment of the present invention, as shown in FIG. 7, includes steps of spreading a sealing member to the electrolyte injection hole formed in the cap plate S10; assembling a cap assembly including the cap plate S20; sealing and joining the opening portion of the can contained in the electrode assembly with the cap plate of the cap assembly S30; injecting electrolyte into the can through the electrolyte injection hole S40; and sealing the electrolyte injection hole in which the sealing member has been coated with the plug S50.

Turning back to FIG. 1, the step S10 of spreading the sealing member in the electrolyte injection hole is to spread the sealing member 372 around the electrolyte injection-hole 362 of electrolyte formed in the cap plate 360.

Thereafter, the step S20 of assembling the cap assembly is to assemble the cap assembly in a single body. The assembling method where accommodating the electrode terminal 310 with the insulating gasket 350 into the central hole that formed in the cap plate 360, the insulating plate 340 and the terminal plate 330, then an end portion of electrode terminal 310 is joined to the terminal plate 330 by welding or compression. The insulating case 320 can be arranged alone inside of the opening portion in the can 200.

Thereafter, the step S30 of sealing the opening portion of the can is sealed the opening portion of the can 200 with the cap plate 360 of cap assembly 300 united in the previous step S20, then the opening portion of the can 200 is sealed.

Next, the step S40 of injecting the electrolyte into the electrolyte injection hole is to inject the electrolyte into the inside of the can 200 through the electrolyte injection hole 362 formed in the cap plate 360.

Finally, the step S50 of sealing the electrolyte injection hole with the plug is insert by force the plug 372 with attached to the sealing member 371 formed in the first extension groove 363 and press into the electrolyte injection hole 362 then inserts by force with pressure to thereby fix, which prevents the electrolyte from leaking.

Figure 8:
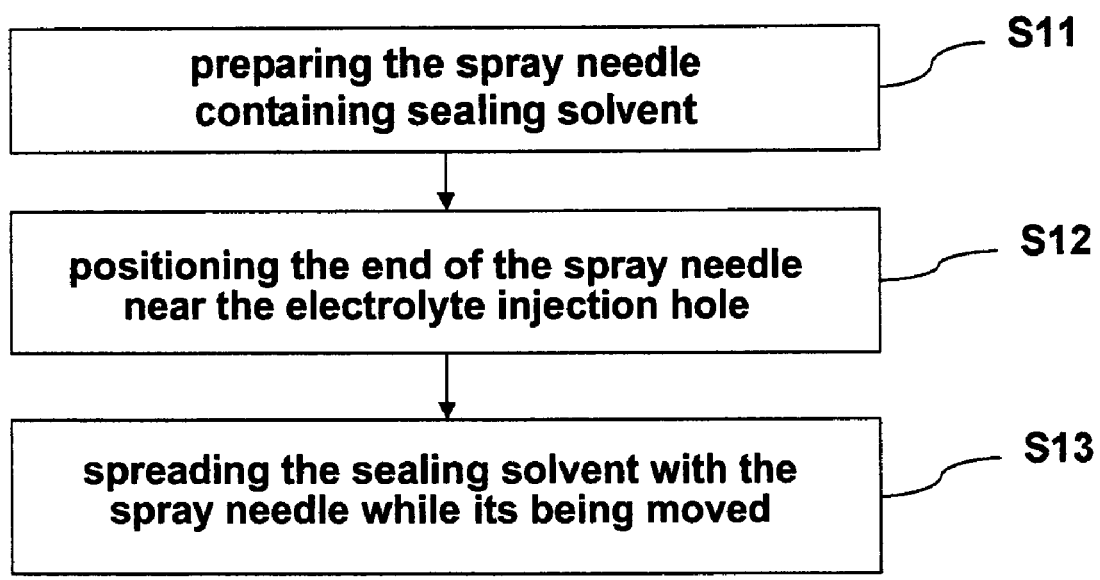
FIG. 8 is a flowchart of the sequence of a method of spreading a sealing member into an electrolyte injection hole according to an embodiment of the present invention.

Referring to FIG. 8, the step S10 of spreading the sealing member to the electrolyte injection hole formed in the cap plate includes the step of preparing the spray needle containing sealing solvent S11; the step of positioning the end of the spray needle to the first extension groove of the electrolyte injection hole of S12; the step of spreading the sealing solvent to the electrolyte injection hole with the spray needle being moved S13.

Figure 9:
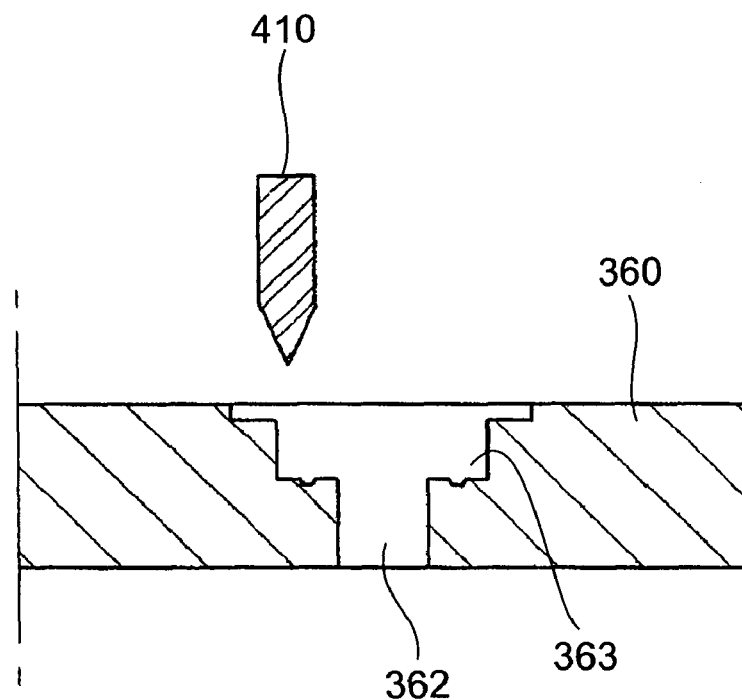
FIG. 9 is a sectional view of a spray needle positioning near the electrolyte injection hole according to an embodiment of the present invention.

Namely, referring to FIG. 9, the step S11 is preparing the spray needle is to prepare the spray needle 410 containing the sealing solvent of liquid phase unhardened in the upper surface of the cap plate 360.

Next, the step S12 of positioning the end of the spray needle to the electrolyte injection hole is to approach the spray needle 410 to the area around the bottom area of outside in the first extension groove 363 of the electrolyte injection hole 362.

Figure 10:
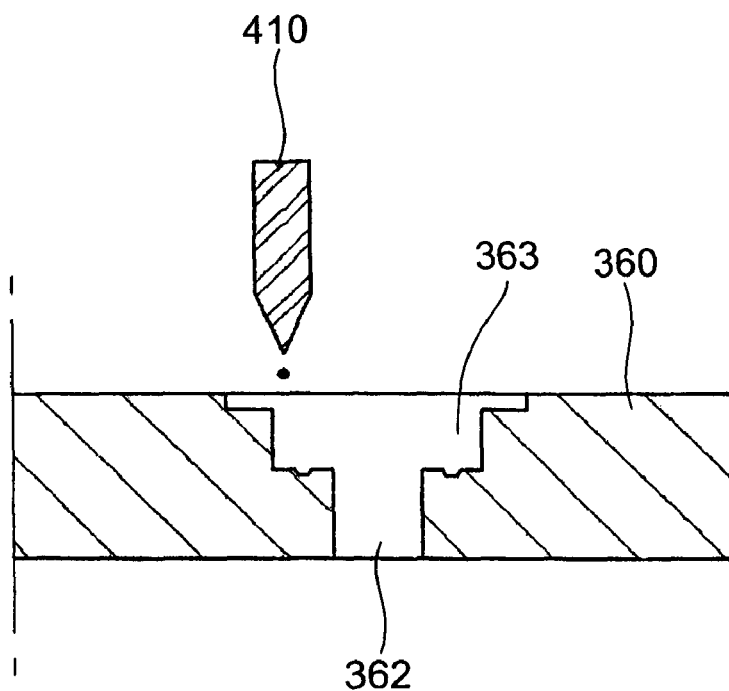
FIG. 10 is a sectional view of the spray needle spreading a sealing member in the electrolyte injection hole according to an embodiment of the present invention.
Figure 11:
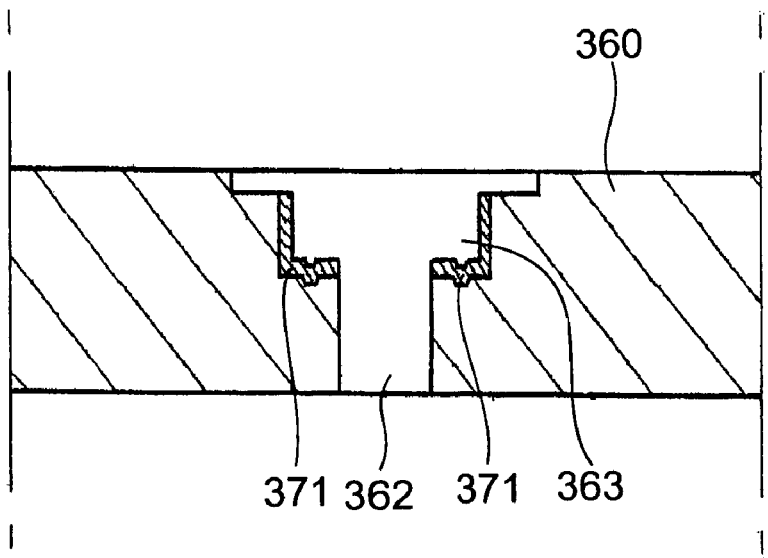
FIG. 11 is a sectional view of a sealing member being formed in the electrolyte injection hole according to an embodiment of the present invention.

Referring to FIG. 10, the step S13 of spreading the sealing solvent with the spray needle being moved is to spread or drop the sealing solvent with the spray needle 410 being moved in the first extension groove 363 of the electrolyte injection hole 362. Throughout the steps S11, S12, S13, the sealing member 371 is coated in the electrolyte injection hole 362 as shown in FIG. 11.

Figure 12:
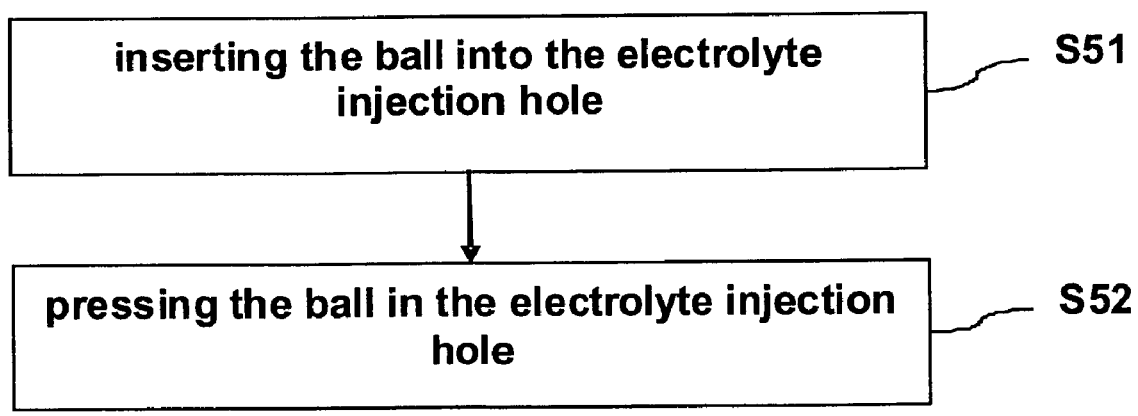
FIG. 12 is a flowchart of a method of sealing the plug with the electrolyte injection hole according to an embodiment of the present invention.

Referring to FIG. 12, the step S50 of sealing up the electrolyte injection hole with the plug includes the step of inserting the ball into the electrolyte injection hole where the sealing member is coated S51; the step S52 of pressing the ball in the electrolyte injection hole to adhere to the sealing member.

Figure 13:
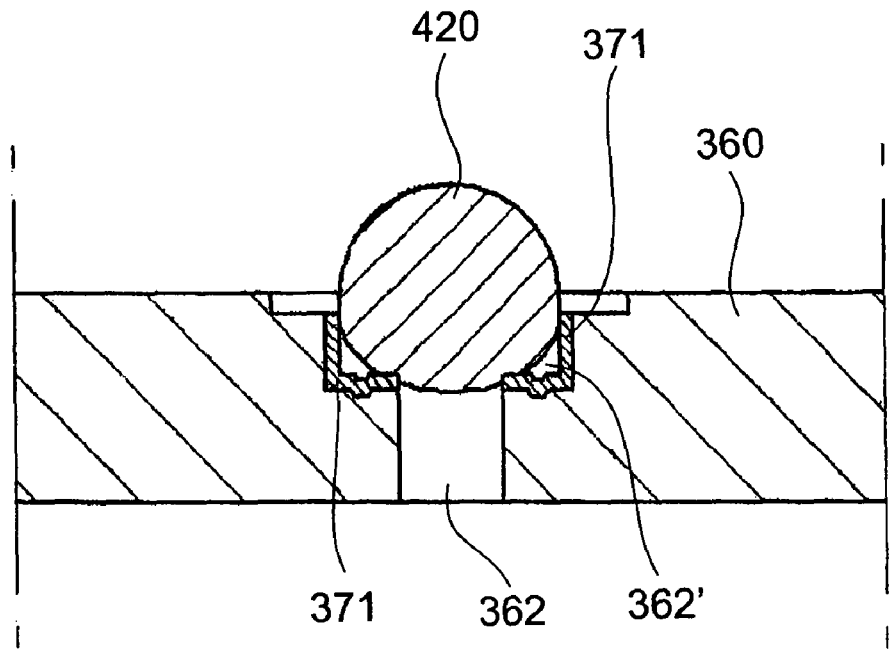
FIG. 13 is a sectional view of a ball inserted into the electrolyte injection hole according to an embodiment of the present invention.

Referring to FIG. 13, the step S51 of inserting the ball 420 in the electrolyte injection hole 362 is to insert the ball 420 in the electrolyte injection hole 362 where the sealing member 371 is coated. At this time, the first extension groove 363 formed for the ball to be settled after the ball 420 is inserted.

Figure 14:
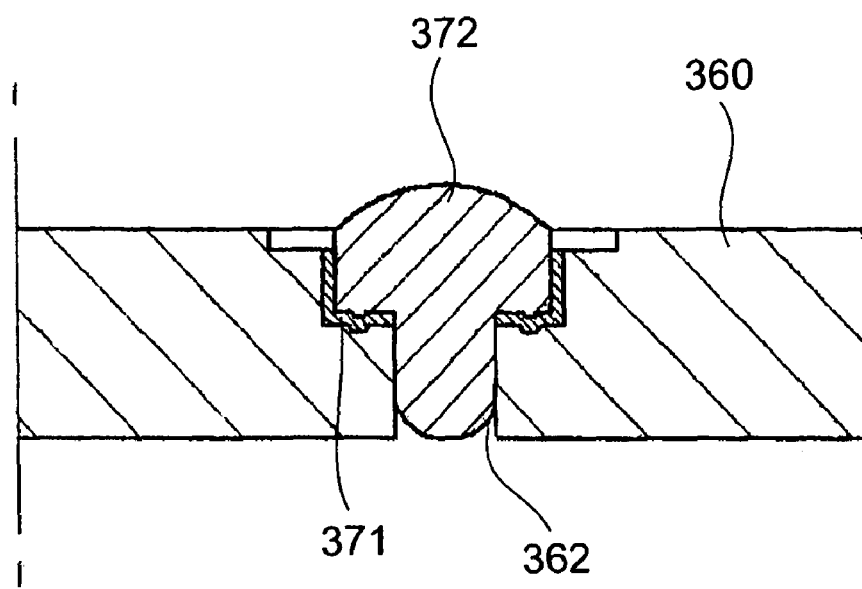
FIG. 14 is a sectional view of the plug formed after the ball is inserted with pressure into the electrolyte injection hole according to an embodiment of the present invention.

Thereafter, the step S52 of pressing the ball in the electrolyte injection hole is to press the ball 420 with adhering to the sealing member 371 by force the ball 420 of metal including good extension rate in the axial direction of the electrolyte injection hole 362, as seen in FIG. 14, forms the plug 372 for sealing the electrolyte injection hole 362 adhering to the sealing member 371.

While this invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

The effect of the present invention occurs when sealing the injection hole of electrolyte with the injection-hole plug after coating the sealing member in the injection hole of electrolyte of the secondary battery.

As the effect following the above, it prevents the leakage of the electrolyte.

Also, the present invention provides the effect of reducing the manufacturing cost due to the simple progress of work.

What is claimed is:

1. A secondary battery comprising,
an electrode assembly including a winding having a positive electrode plate and a negative electrodes plate stacked together with a separator interposed between the positive and negative electrode plate;
a can having an opening portion to receive the electrode assembly;
a cap assembly including a cap plate to close the opening portion of the can, the cap plate having an electrolyte injection hole arranged therein;
a first extension groove having a greater diameter than that of the electrolyte injection hole, the first extension groove having a circular side wall and a bottom wall extending from the circular side wall, said first extension groove being arranged in an entering portion of the electrolyte injection hole and having a plurality of hollow portions arranged on the surface of the first extension groove, wherein each of said plurality of hollow portions is positioned such that a flat portion of the surface of the first extension groove is located between two neighboring hollow portions and said plurality of hollow portions having a trapezoidal sectional shape, said trapezoidal sectional shape having two parallel sides of different lengths to have an upper side larger than a bottom side; and
a plug for sealing the electrolyte injection hole, the plug being provided with a head portion attached to the side wall and bottom wall of the first extension groove and a body portion coupled to the electrolyte injection hole.

2. The secondary battery as claimed in claim 1, further comprising a sealing assembly including a sealing member arranged on the surface of the first extension groove, wherein the plug is attached to the sealing member to seal the electrolyte injection hole.

3. The secondary battery as claimed in claim 2, wherein the sealing member is arranged in the first extension groove.

4. The secondary battery as claimed in claim 2, wherein the sealing member arranged on a hollow portion of the electrolyte injection hole is thicker than the sealing member arranged on a surface thereof having no hollow portion.

5. The secondary battery as claimed in claim 2, wherein a second extension groove having an even depth and a diameter greater than that of the first extension groove is arranged at an entering portion of the electrolyte injection hole having the first extension groove arranged therein.

6. The secondary battery as claimed in claim 2, wherein a boundary edge between the first extension groove and the electrolyte injection hole is chamfered.

7. The secondary battery as claimed in claim 2, wherein the sealing member comprises a rubber material.

8. The secondary battery as claimed in claim 7, wherein the sealing member comprises a rubber selected from a group consisting of fluorine-rubber, butadiene rubber, and isobutylene-isoprene rubber.

9. The secondary battery as claimed in claim 2, wherein the sealing member comprises either fluorine-resins or polyolefin-resins.

10. The secondary battery as claimed in claim 2, wherein the plug comprises aluminum or an alloy of aluminum.

* * * * *